J. N. DAVIS.
STORAGE BATTERY GRID.
APPLICATION FILED MAR. 17, 1913.
1,076,027.
Patented Oct. 21, 1913.
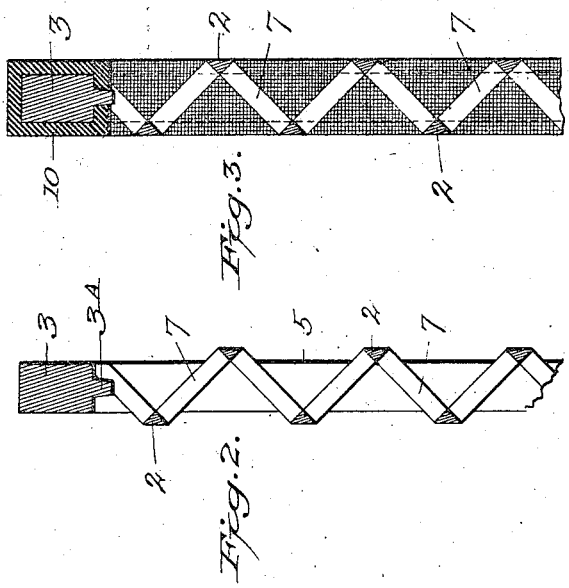
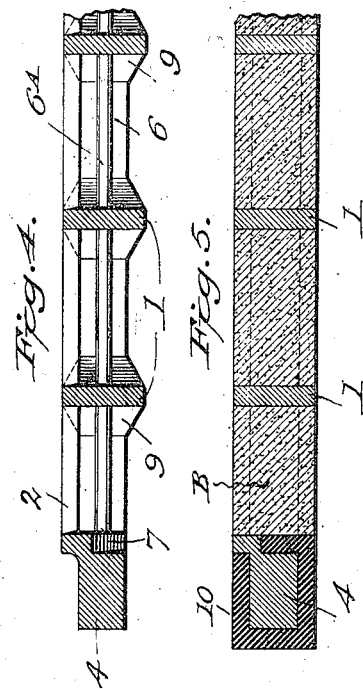
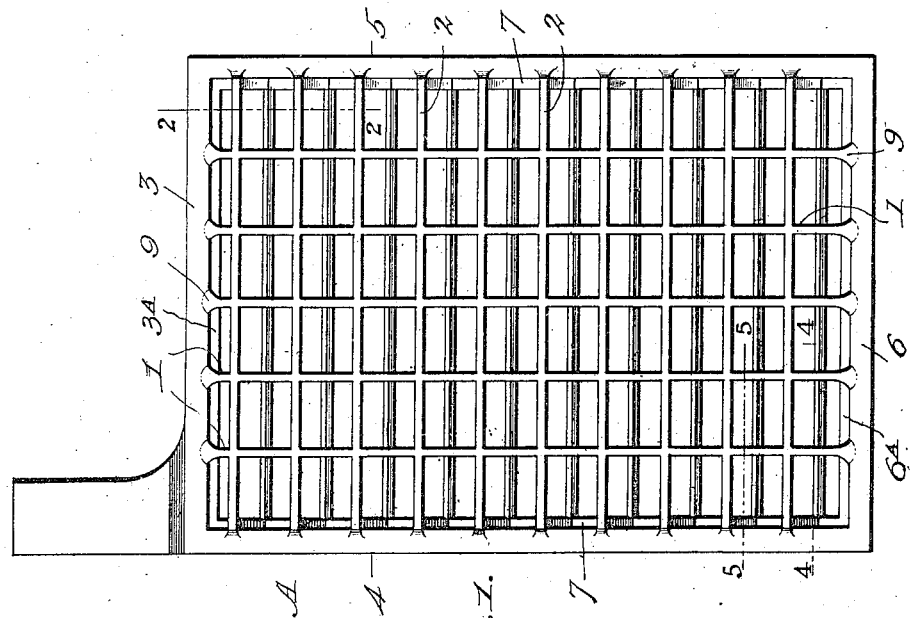
Witnesses:
Preston Davis.
Mary C Davis
Inventor:
Jasper N Davis

UNITED STATES PATENT OFFICE.

JASPER N. DAVIS, OF DENVER, COLORADO.

STORAGE-BATTERY GRID.

1,076,027.

Specification of Letters Patent.

Patented Oct. 21, 1913.

Application filed March 17, 1913. Serial No. 755,010.

*To all whom it may concern:*

Be it known that I, JASPER N. DAVIS, a citizen of the United State of America, residing in the city and county of Denver and State of Colorado, have invented a new and useful Storage-Battery Grid, of which the following is a specification.

My invention relates to improvements in storage battery grid construction.

The object of the invention is to provide a grid, the outer supporting frame of which has a special construction adapted to receive on the outer surface an insulation adhered thereto, the purpose of said insulation being embodied in my application for patent Serial Number 700,002, filed May 27, 1912. This improvement consists in giving the body portion or that part which receives the active material, a greater depth or thickness than to the outer main supporting frame of the grid, as compared to the present construction, but in no wise diminishing the strength, as will be shown in the following illustrated drawings:

Figure 1, is a side view of a storage battery grid before the active material is applied, my improvement being confined to the outer four sides. Fig. 2, is an enlarged vertical sectional view of a portion of one side of the grid, showing more clearly the construction of the outer supporting bar, having the zigzag web. Fig. 3, is a view similar to Fig. 2, showing this section of the grid as it appears after the insulating material has been applied, the insulating material which adheres to the frame being flush with the cross bars of the inner grid. Fig. 4, is a horizontal sectional view on the line 4—4 of Fig. 1. And Fig. 5, is a horizontal sectional view of a completed grid, on the line 5—5 of Fig. 1.

The same reference characters indicate the same parts in all the views.

The letter "A" designates the grid of a storage battery before the active material "B" has been applied.

1 designates the vertical bars, and 2 the cross bars. The vertical bars 1 and the cross bars 2 may be of any design, as my improvement is confined to a special construction of the outer frame or supporting bars 3, 4, 5 and 6 of the grid, and the manner in which the cross retaining bars 1 and 2 are secured to the said frame.

The sides and ends of the outer surrounding frame are of less thickness than the thickness of the grid portion, to allow for the thickness of an insulation 10, which I will explain further on. As the frame members are of less thickness than the grid proper, which would tend to weaken the cross bars 2, a counter support 7 is provided in the form of inner zigzag projections of the outer side bars 4 and 6, which are integral with the cross bars 2, the object being to give the cross bars 2 a rigid support and connection with the side bars of the frame, which they would otherwise not have on account of the diminished thickness of the said side bars, as clearly shown in Fig. 2. The ends of the bars 2 are beveled off at their union with the sides of the frame, but this connection alone would not give sufficient strength to them without their connection with the zigzag web supports 7.

The upright bars 1 in the drawing, are less in numbers than the bars 2, and of a width corresponding to the full depth of the grid, and while their ends may be connected to the frame in the same manner as the ends of the bars 2, I do not confine myself to this method of connecting their ends or those of the bars 2 to the frame, as there are many forms of inner grid construction on the market, for retaining the active material in place, and any form of support may be used to secure them to the outer supporting bar of the four sides of the grid. In Fig. 4, however, is shown a bevel footing 9 on each side of the upright bars 1, which strengthens their connection with the upper and lower frame members. These members 3 and 6, are also formed with integral longitudinal webs or extensions 3$^A$ and 6$^A$ respectively, which project from their inner edges; and which are preferably tapered in cross section as shown in Figs. 2 and 3. These webs are also integrally connected to the uprights 1, where they unite with the frame members 3; and they not only serve as an additional strengthening medium for the ends of the said uprights, but they also act as dividing walls for the insulating material 10, which surrounds these frame members, the said material adhering to their opposite sides, as clearly shown in Fig. 3, while the webs are of slightly greater depth than the thickness of the insulating material. The reason for using these supports 3$^A$ and 6$^A$, is that otherwise the point of connection between the inner active material retaining bars 1 and 2 and the frame, would not be such as to afford sufficient strength to support the weight of the full carrying capacity of the bars, or, in other words, without this form of connection, the union of the bars 1 and 2 with the side bars of the frame, would not be sufficient for the purpose required. Therefore, in order to give the required strength, and current carrying capacity, to the bars or active material retainers 1 and 2, their ends are connected to the frame in the manner above described, the inner supporting webs of the bars 1, and the zigzag bars 7, being an integral part of the outer frame. The inner edges of the supports 7 and the webs 3$^A$ and 6$^A$, also come in touch with the active material of the plate, which is an advantage. The outer frame being of less thickness than the depth of the grid, permits a sufficiently thick body of a suitable insulating material 10 to be secured rigidly to the outer supporting frame and supports 7 and webs 3$^A$ and 6$^A$, to prevent the same from being attacked by the acid or solution of the storage battery cells during their working conditions, thus preventing the so-called "moss-grown" or "oozing out" of the negative plate to such an extent as to reach across the separators on the outer four sides and come in contact with the positive plates, which short-circuits the cells. On the tops of the negative plates also, the greater damage is done in short circuiting the cells, by the said "moss-grown" or "oozing out" portions coming in contact with the positive plate connecting strap which extends across the top of the elements at right angles to the plates. It is well known by those familiar with batteries that short-circuited cells shorted from the latter cause, are more serious than from all other causes, excepting, of course, shorted cells due to the accumulation in the bottom of the jars of the disintegrated active material from the positive plates. But this is no more injurious to the elements than the short circuits between the connecting positive straps and the "moss-grown" negative outer grid at the top of the negative plates. There are practically only three ways in which the cells of a lead storage battery become shorted: by the accumulation of disintegrated active material from the positive plates, from defective or worn-out separators, and from the "moss-grown" or "oozing out" of the outer supporting frame of the negative plate grid. By eliminating the possibility of the short-circuit caused by the latter condition, which can be accomplished by the construction of the outer grid of the storage battery plate as I have herein illustrated and explained, the expense for maintaining a lead storage battery is reduced to a minimum, and the life is increased to a maximum, the expense of labor being thereby reduced. Increasing the life of the battery is accomplished by maintaining a uniform working condition of each cell, due to the elimination of short circuits around the outer edges of the plates, and by bringing into action again the disintegrated active material from the positive plates after it has filled the bottom of the jars up to and against the bottom edges of the plates. It then adheres to and makes contact again with its mother positive plates, thereby increasing and maintaining the efficiency of said positive plates, but does not make contact with the negative plates, because the outer grid construction herein outlined, having the insulation applied and adhered thereon, prevents contact with the outer exposed portion of the negative plate with the disintegrated active material.

Having thus described the nature and object of my invention, what I claim as new and desire to secure by Letters Patent, is:

1. In storage battery grid construction, the combination with a supporting frame, of inner active material retaining members having at their intersection with the outer supporting frame, connecting members which extend across the inner edges of the vertical members of the frame, and which are also an integral part of said frame, said frame being of less thickness than the depth of the retaining members and embedded in an insulating material.

2. In a storage battery grid, a rectangular frame having integral zigzag webs on the inner edges of its opposite side members, the apexes of which extend beyond the faces of said side members, transverse bars extending across the frame on each side thereof, which are integrally connected at their ends with the apexes of said zigzag webs, and vertical bars integral with the transverse bars and with the frame and of greater width than the thickness of the frame, said frame having a coating of insulating material.

3. In a storage battery grid, a rectangular frame, bars extending across the frame on opposite sides thereof, and in alternate order, and projections on the inner edges of the frame, integral therewith, and with the ends of the said bars, said frame being coated with an insulating material which is flush with the outer surfaces of the bars.

4. In a storage battery grid, a rectangular frame having integral upright bars of greater width than the thickness of the frame, integral zigzag webs on the inner opposing edges of the vertical members of the frame, the apexes of which project beyond the faces of said side members, and bars extending across said frame on opposite sides thereof, the ends of which are integrally connected with the apexes of said zigzag webs, said frame being embedded in an insulating material which is flush with the outer faces of said bars and fills the recesses formed by said zigzag web.

5. In a storage battery grid, a frame embedded in non-conducting material, and having integral bars extending across its opposite sides in alternate order, and from the inner opposing edges of opposite members of said frame, the outer surfaces of which are flush with the outer surface of said insulating material, bracing webs on said opposing edges, integral with the said edges and with the ends of the alternating bars, and bars at right angles to the alternating bars integral therewith, and with the frame, and of a width corresponding to the greatest depth of the frame.

6. A storage battery grid comprising in one integral structure, a rectangular frame, zigzag ribs on the inner edges of the side members of the frame, bars connecting the apexes of one zigzag rib with those of the opposite rib, the space between the outer faces of the alternate bars being greater than the thickness of the frame members, and bars connecting the end members of the frame, said frame members being embedded in an insulating material which on opposite sides of the frame is flush with the outer surfaces of the said bars.

7. A storage battery grid comprising in one integral structure, a rectangular frame, raised bars on one side of the frame, connecting the inner edges of its side members, raised bars on the opposite sides of the frame which alternate with the first bars, zigzag ribs on the inner edges of said side members connecting said bars, and bars connecting the end members of the frame, the members of said frame being embedded in an insulating material which on the opposite side is flush with the outer surfaces of said bars.

8. In a storage battery grid, a rectangular frame, integral alternating horizontal bars on opposite sides thereof, and vertical bars integral with the horizontal bars and with the upper and lower frame members, said members also having integral webs on their inner edges which are also integrally connected to said vertical bars at their point of unison with the upper and lower frame members, said frame being of less thickness than the depth defined by said vertical and horizontal bars, and a coating of insulating material surrounding the members of said frame and flush with the outer surfaces of said bars.

In testimony whereof I affix my signature in presence of two witnesses.

JASPER N. DAVIS.

Witnesses:
 MARY E. DAVIS,
 PRESTON DAVIS.

---

Copies of this patent may be obtained for five cents each, by addressing the "Commissioner of Patents, Washington, D. C."